United States Patent [19]
Krebs

[11] Patent Number: 5,696,735
[45] Date of Patent: Dec. 9, 1997

[54] SEISMIC MIGRATION USING OFFSET CHECKSHOT DATA

[75] Inventor: Jerome R. Krebs, Houston, Tex.

[73] Assignee: Exxon Production Research Company, Houston, Tex.

[21] Appl. No.: 812,819

[22] Filed: Mar. 6, 1997

Related U.S. Application Data

[63] Continuation of Ser. No. 325,854, Oct. 19, 1994, abandoned.
[51] Int. Cl.$^6$ .............................. G01V 1/36; G01V 1/28
[52] U.S. Cl. .............................. 367/50; 367/53; 367/73; 364/421
[58] Field of Search .............................. 367/50, 53, 73; 364/421, 422

[56] References Cited

U.S. PATENT DOCUMENTS 5,198,979  3/1993  Moorhead et al. ..................... 364/421

OTHER PUBLICATIONS

Al-Yahya, K.M. (1989). "Velocity analysis by iterative profile migration," Geophysics, v. 54, No. 6, pp. 718–729.

Deregowski, S.M. (1990). "Common–offset migrations and velocity analysis," First Break, v. 8, No. 6, pp. 225–234.

Kim, Y.C. and Gonzalez, R. (1991). "Migration velocity analysis with the Kirchhoff integral," Geophysics, v. 56, No. 3, pp. 365–370.

Larner, K. and Cohen, J.K. (1993). "Migration error in transversely isotropic media with linear velocity variation in depth," Geophysics, v. 58, No. 10, pp. 1454–1467.

Lines, L. (1991). "Applications of tomography to borehole and reflection seismology," The Leading Edge, v. 10, pp. 11–17.

Geoltrain, S. and Brac, J. (1993). "Can we image complex structures with first–arrival traveltime?" Geophysics, v. 58, No. 4 pp. 564–575.

Schleicher, K.L., Grygier, D.J., et al., Ed. (1991). Migration Velocity Analysis: A Comparison of Two Approaches, 61st Annual International Mtg., Society of Exploration Geophysicists, Expanded Abstracts, v. 2, pp. 1237–1238.

Yilmaz, O. and Chambers, R.E. (1984). "Migration velocity analysis by wavefield extrapolation," Geophysics, v. 49, no. 10 pp. 1664–1674.

Jerome R. Krebs, "3D Velocity Analysis Using Limited Aperture Migration", *EAG/SEG Summer Workshop—Noordwijkerhout*, The Netherlands 24–27 Jul. 1994, pp. 62–65.

Jerome R. Krebs, "Three–dimensional migration of swath surveys", *Geophysics* vol. 55, No. 9 (Sep. 1990), pp. 1251–1259, 8 figs.

Jerome R. Krebs, "Accurate migration using offset–checkshot surveys", pp., 1186–1187, 2 figs. SEG International Exposition and 65th Annual Meeting, Oct. 8–13, 1995, Houston, Texas.

Y. C. Kim, J. R. Krebs, "Pitfalls in Velocity Analysis Using Common–offset Migration", 8 figs, AAPG Pacific Sect. Meeting, Apr. 27–29, 1994, AAPG Bulletin vol. 78, No. 4, p. 668, Ventura California.

(List continued on next page.)

*Primary Examiner*—Nelson Moskowitz
*Attorney, Agent, or Firm*—S. P. Koch; K. A. Bell

[57] ABSTRACT

A method of migrating seismic data using offset checkshot survey measurements. The offset checkshot survey measurements involve raypaths similar to the migration raypaths for the seismic data, and are used to determine direct arrival traveltimes to receivers in a borehole. Embodiments of the invention provide for direct use of the traveltimes in migration, or indirect use of the traveltimes in migration via construction of a migration velocity model. The velocity model embodiments further provide for either traveltime error correction via use of interpolated error functions or construction of migration error tables. The invention can be employed for time, depth or Kirchhoff migration, in either two or three dimension, and in either prestack or poststack applications.

14 Claims, 6 Drawing Sheets

OTHER PUBLICATIONS

Sam Blakeslee, Sen Chen, Jerry Krebs, Len Srnka, "TVSC: Twin-VSP Simulation of Crosswell Data, A Strategy For Low-Cost Monitoring of EOR Processes", 63rd Annual SEG Meeting, Sep. 26-30, 1993, Washington, D.C.

Geist, L.; Geobyte, vol. 2, #3, 1987; pp. 18-24.

Lu, et al; 64th Annu SRG Lat. Prty. Oct. 23, 1994., pp. 765-766; abst. only herewith.

Dillon, P.B., Geophysics, vol. 53, #6, pp. 786-799, Jun. 1988, abst. only herewith.

SEISMIC MIGRATION USING OFFSET CHECKSHOT DATA

This application is a continuation of application Ser. No. 08/325,854, filed Oct. 19, 1994, now abandoned.

FIELD OF THE INVENTION

This invention relates to a method of geophysical prospecting which improves the accuracy of seismic migration. Specifically, the invention uses offset checkshot survey measurements to accurately migrate reflectors present in conventional two-dimensional and three-dimensional surface seismic data.

BACKGROUND OF THE INVENTION

In seismic exploration, energy imparted into the earth by a seismic source reflects from subsurface geophysical features and is recorded by a multiplicity of receivers. This process is repeated numerous times, using source and receiver configurations which may either form a line (2-D acquisition) or cover an area (3-D acquisition). The data which results is processed to produce an image of the reflector using a procedure known as migration.

Seismic data migration typically uses diffraction traveltimes from subsurface imaging points to the source and receiver locations to produce an image of the subsurface reflectors. The diffraction traveltimes are the seismic signal propagation times along raypaths from each imaging point to the source and receiver locations. The propagation times, which are usually plotted as diffraction traveltime curves, are used after appropriate preprocessing of the raw seismic data to generate an estimate of the correct location of the reflector. The migration process will be familiar to those versed in the art.

Incorrect diffraction traveltime curves lead to at least two undesirable migration consequences. First, the image of the reflector which results will be poorly focused, making interpretation difficult. Second, the reflector may be mispositioned, a serious drawback in oil and gas exploration where accurate mapping of the subsurface structure is important. The effects of poor focusing and improper positioning are particularly apparent when migrating steeply dipping reflectors or when migrating in areas having significant lateral velocity variations.

In conventional practice, an estimated subsurface velocity model is used to generate the diffraction traveltime curves. One common method of estimating that model is to analyze seismic data corresponding to raypaths which are inclined less than about 450 with respect to the vertical. The velocities can be determined by analyzing the variation in reflection traveltime as a function of distance between sources and receivers in the surface data. Because the near vertical raypaths are shorter than more nearly horizontal raypaths, the traveltimes are less sensitive to velocity errors and to lateral or vertical velocity variation. Unfortunately, accurate migration of steeply dipping reflectors, such as salt flanks and faults, also requires accurate traveltimes for raypaths that are closer to horizontal.

Another method that is used to obtain migration velocities is to prestack migrate several subsets of the surface seismic data. This is commonly done using either common-shot, common-offset or common-depth-point gathers. The migration is performed with an initial velocity model obtained from conventional normal moveout velocity analysis. If the migrations produce images that are consistent, the initial velocity model is taken to be correct. Otherwise, the velocity model is updated to give a model that gives a better migration. Several iterations are usually required to obtain a consistent migrated image. Variations of this method include depth focusing analysis and migration velocity sweeps.

Reflection tomography can also be used to determine migration velocities from surface seismic data. Reflection events on unstacked surface seismic data are first digitized. A gridded model of the subsurface is then optimized to give the best fit to the observed traveltimes. Unfortunately, surface seismic data do not contain enough information to uniquely specify both a migration velocity model and the reflector geometries. As a result, the derived velocity model may be ambiguous or geologically unreasonable. Improvements can be made by applying constraints to the optimization process, but those constraints generally reduce or eliminate the ambiguities at the expense of poorer fits to the traveltime data.

Vertical checkshot data and well sonic logs are also commonly used for obtaining a migration velocity model. Vertical checkshot data are gathered by placing a receiver in a well and measuring first arrival travel times from a source placed vertically above the receiver. These data are typically gathered at depth intervals in the well of 250 to 500 feet. Velocities can be determined from the checkshot data by dividing the distance between adjacent receivers by their associated traveltimes. Vertical checkshots therefore measure only the vertical velocity. Migrating the seismic data with the vertical checkshot velocity guarantees that reflections from nearly horizontal reflectors will be accurately imaged at the well. Unfortunately, a velocity that gives small traveltime errors for vertical raypaths may produce much larger errors for horizontal raypaths.

Sonic logs, like vertical checkshot surveys, measure vertical velocities. As a result, steeply dipping reflectors may be mispositioned. In addition, sonic logs suffer from the additional drawback that the velocity measurements are made at higher frequencies than are normally present in seismic data. Due to velocity dispersion (i.e. the variation of velocity with frequency), those frequencies are higher than are appropriate for migrating seismic data.

None of the above methods for determination of migration velocities account for velocity anisotropy (the variation of velocity with respect to the propagation angle of a raypath). Anisotropy is frequently present in seismic data as a higher order term in the diffraction event time-offset curves. Although a reasonably good match to observed seismic data can usually be obtained from an isotropic migration velocity model, for example the migrated images may be reasonably well-focused and consistent, the reflectors may nevertheless be mispositioned. Typically, any such mispositioning results from the fact that reflections from steep features have raypaths involving a large range of propagation angles, each of which may have velocities not taken into account by the isotropic model. In such cases additional information must be used to determine an anisotropic velocity model. This is generally a difficult task, given that even in laterally homogeneous media the higher order term may be hard to separate from terms associated with vertical inhomogeneities. In addition, conventional migration software does not usually account for anisotropy even if a reasonable anisotropic velocity model were available. As a result, conventional processing often suffers from an inability to accurately image steeply dipping reflections in regions having anisotropic media.

Migration velocities can also be estimated from vertical seismic profile (VSP) data gathered with sources at a range of offsets from the well. Optimization methods referred to as traveltime tomography are used to determine a velocity model. Unfortunately, the velocity model obtained from traveltime tomography suffers from the non-uniqueness problem similar to that which occurs in reflection tomography. In addition, the model produces a good migration at the well but degrades in image quality elsewhere. As in reflection tomography, imposition of constraints during the optimization reduces the ambiguities and produces geologically reasonable models at the expense of a poorer match to the traveltime data.

Migrated images may also be of poor quality as a result of the manner in which the traveltime curves are processed by the migration routines. Many migration programs, particularly those using the Kirchhoff method, sum the seismic data along traveltime curves corresponding to the first arrival only, and ignore subsequent arrivals. However, lateral velocity gradients and some geologic structures can lead to multivalued diffraction traveltimes, each of which may be important, or any one of which may be more important than the first arrival. In particular, later arrivals may carry more of the seismic energy than does the first arrival. If the migration ignores or mishandles the later arrivals, poor quality images will result.

Another constraint of some migration routines deals with the ability to migrate all points on the diffraction traveltime curve. Some routines are limited in the capacity to accurately migrate the entire curve. In such cases, it is preferable to migrate with traveltimes that are as accurate as possible for diffraction raypaths corresponding to the reflector dips of greatest interest. Those dips are often the steeply dipping reflectors, which are more sensitive to horizontal velocity errors than are horizontal reflectors. As noted, however, horizontal velocities are generally poorly characterized in conventional velocity models.

Once a diffraction traveltime curve has been derived and the seismic data has been migrated, it is useful for the data analyst to have an estimate of the accuracy of the position of the reflector in the migrated image. Conventionally, that estimate is obtained by correlating borehole measurements, such as from sonic logs or dipmeters, with the image. High correlations indicate an accurate migration.

There are several limitations to the correlation approach however. A poor correlation with borehole data may indicate migration error, but does not quantify that error. In addition, other problems, such as inaccurate estimation of the seismic wavelet, can lead to poor correlation between well data and a seismic image. And finally, a good correlation between well data and the shallow dipping reflectors in the image does not necessarily imply that the steep dips are accurately migrated. In particular, because wells do not always penetrate steeply dipping reflectors, such as the flanks of salt domes, the correlations are not meaningful at the locations in which the greatest accuracy is desired. Because hydrocarbon reserve estimates can be quite sensitive to the position of the steeply dipping reflectors, the correlations are often of limited value to the analyst.

Fundamental to this entire discussion of conventional practice relating to the development of diffraction traveltimes is the reliance on the velocity model as the desired or preferred input to the migration process. However, velocities are neither the fundamental parameters required for migration, nor the parameters directly obtained from field measurements. Rather, traveltimes are the underlying parameters on which migration accuracy relies, and the traveltimes associated with the raypaths for a family of source and receiver configurations are the parameters directly obtained in the field. Procedures which rely more directly on traveltimes as a migration input would reduce errors deriving from the use of velocity models, and are therefore desired within industry.

From the foregoing, it can be seen that there is a need for a method of generating diffraction traveltimes for use in seismic migration which gives improved accuracy for near-horizontal raypaths, which can handle velocity anisotropy, and which takes into account multivalued traveltime curves. Preferably, the method should rely on measured diffraction raypath traveltimes to provide for accurate migration of seismic data, either directly as an input to migration or indirectly by improving the accuracy of the input velocity model. The method should also provide for a quantitative estimate of any migration error. The present invention satisfies these needs.

SUMMARY OF THE INVENTION

This invention overcomes the above limitations of the prior art by using offset checkshot survey data gathered from a region adjacent to a subsurface feature to be imaged to determine a migration velocity model, migration traveltimes, or both. The offset checkshot survey involves surface sources and borehole receivers placed in a geometry which results in raypaths geometrically similar to the raypaths in the seismic data to be used in imaging the feature. The offset checkshot survey data not only allows for accurate migration of the seismic data, but also leads to embodiments of the present invention in which migration error estimates may be calculated.

The embodiment of the invention to be implemented in a specific analysis depends on the nature of that analysis and on the characteristics of the region adjacent to the feature. For example, one embodiment of the invention can be used to generate a reflector-weighted migration velocity model to allow accurate migration of the reflector dips of greatest interest. That embodiment would be most appropriate for a region characterized by laterally invariant migration velocities or for an analysis involving time migration. If the migration velocity is laterally varying, depth migration is likely to be involved and the present invention can be used to develop an optimized migration velocity model for all dips. Both of these embodiments also enable the analyst to determine the positioning error of the reflectors in the migrated image.

For traveltime migration, embodiments of the invention exist which allow both conventional and model-guided traveltime interpolation. These embodiments are appropriate for Kirchhoff-type migrations, which are more expensive than time or depth migration, but which are also more accurate.

The invention can be applied to both two dimensional and three dimensional migration. In addition, either prestack or poststack embodiments of the invention can be employed.

BRIEF DESCRIPTION OF THE DRAWINGS

The present invention and its advantages will be more easily understood by reference to the following detailed description and the attached drawings in which.

Figure 1:
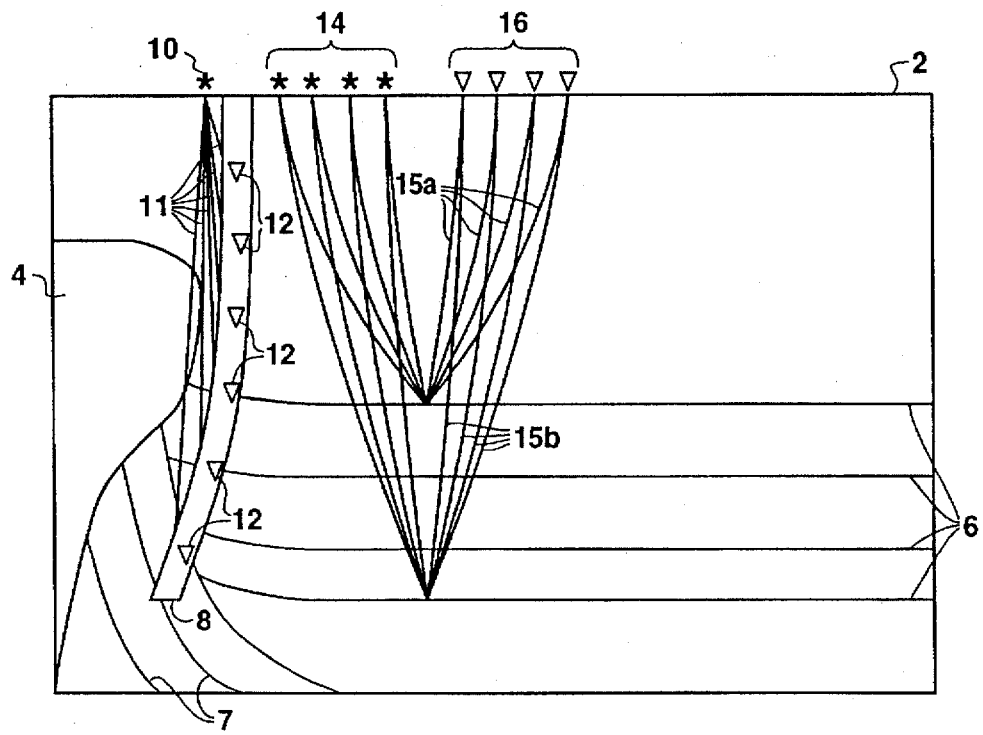
FIG. 1 shows the geometry of source and receiver positions which are conventionally used to determine traveltimes and velocity models for migration of seismic data.

While the invention will be described in connection with its preferred embodiments, it will be understood that the invention is not limited thereto. On the contrary, it is intended to cover all alternatives, modifications, and equivalents that may be included within the spirit and scope of the invention.

DETAILED DESCRIPTION OF THE PREFERRED EMBODIMENTS

The present invention is a method of migrating seismic data using offset checkshot survey (OCS) data. The method uses OCS data to accurately determine diffraction traveltimes which, either directly or indirectly, are required inputs to seismic migration routines. The method also provides for use of the OCS data to generate a table of migration error as a function of migrated location and dip. These two attributes of the present invention thereby allow geologic interpreters to determine the subsurface location of migrated seismic images more accurately than has heretofore been possible.

As discussed above, tomographic methods are frequently used to derive migration velocity models. However, those methods may produce velocity models with significant differences between measured and modeled traveltimes, or which may be geologically unreasonable. In addition, conventional tomography makes no attempt to control the distribution of traveltime errors produced by model. This invention provides several solutions to these problems.

First, the invention has the capability of determining the combinations of sources and receivers which most significantly contribute to the image of any given reflector dip. For example, migrated images are often more sensitive to traveltime errors for nearly horizontal raypaths, which are not generally used to generate velocity models, than to traveltime errors for nearly vertical raypaths. In addition to the more accurately reproduced horizontal raypath traveltimes, the invention enables the traveltimes corresponding to specific sources and receivers to be weighted in the tomographic reconstruction of the velocity model. Those sources and receivers are preselected to give improved accuracy in the migration of the reflector dips of highest interest. This represents an improvement on conventional methods in which either all data are weighted equally or the data are weighted based merely on an assumed confidence level in the traveltime measurement.

Second, if tomography does not produce a satisfactory velocity model, the invention can be used to quantify the migration error that will result from the migration. The error estimates can be used to improve the accuracy of the geological interpretations made based on the velocity model. No prior techniques exist which allow such a quantification of migration error.

Finally, some migration routines accept diffraction traveltimes directly. In this invention, offset checkshot traveltimes can be directly input into those routines without the necessity of producing a velocity model. Because the checkshot raypaths accurately measure traveltimes from the surface to the borehole, the result is an image that is accurate at the borehole for all dips. The invention includes embodiments which allow conventional and model-guided interpolation of diffraction traveltimes.

Figure 2:
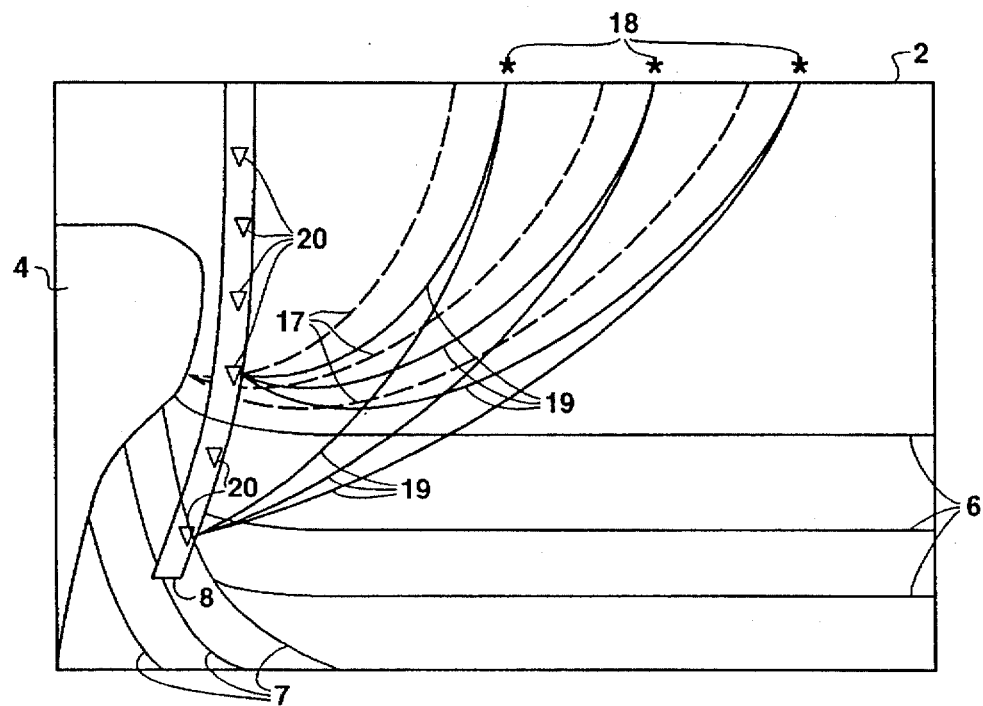
FIG. 2 shows the geometry of source and receiver positions used in the present invention to determine migration traveltimes and migration error tables.

FIGS. 1 and 2 compare seismic source and receiver configurations of one embodiment of the present invention (FIG. 2) to the prior art (FIG. 1). In both figures, the earth's surface 2, which overlies a geophysical feature 4, steeply dipping reflectors 7, and a plurality of generally horizontal reflectors 6, is penetrated by borehole 8.

FIG. 1 depicts two techniques which are used in the prior art to develop velocity models and diffraction traveltime curves. The first technique is to use a vertical checkshot source 10, positioned on surface 2 adjacent to borehole 8, to generate signals along raypaths 11. Velocities and traveltimes associated with raypaths 11 are determined from analysis of the direct arrivals at receivers 12. A second conventional technique, also depicted in FIG. 1, involves use of a family of surface sources 14 and a family of surface receivers 16. Sources 14 generate signals which travel along raypaths 15a and 15b and reflect from reflectors 6 before being received by receivers 16. By analyzing the variation of reflection traveltime as a function of distance between sources 14 and receivers 16, average migration velocities and traveltimes can be determined.

Advantages of the present invention are demonstrated in FIG. 2, which depicts migration raypaths 17 as well as offset checkshot raypaths 19. Migration raypaths 17 derive from processing of the surface seismic data to be used to image feature 4 and reflectors 7 (sources and receivers corresponding to that surface seismic data are not shown). Offset checkshot raypaths 19 derive from offset checkshot survey sources 18 which generate signals received by offset checkshot receivers 20.

The OCS sources are located along surface 2 such that raypaths 19 are generally horizontal near borehole 8, which thereby leads to a geometric similarity between raypaths 19 and raypaths 17. As a result of that geometric similarity, traveltimes and velocity models which derive from raypaths 19 more accurately characterize the traveltimes and velocities which are required for migration along raypaths 17 than do the traveltimes and velocity models which result from raypaths 11, 15a, and 15b in FIG. 1. In addition, as is well known in the art, horizontally traveling raypaths are necessary to accurately develop a migrated image of steeply dipping features such as feature 4 and reflectors 7. In contrast, raypaths 11, 15a, and 15b are essentially vertical. Although vertical velocities and traveltimes are well characterized by raypaths 11, 15a, and 15b, horizontal variations, such as result from anisotropy, are not well characterized, thus leading to inaccuracies in the migrated images. By including raypaths with horizontal components, the present invention minimizes or entirely eliminates those inaccuracies.

The range along surface 2 over which the checkshot sources should be placed will be a function of the expected characteristics of feature 4 and reflectors 7. As is well known in the art, that range, which is also referred to as the migration aperture, is preferably large relative to the steepest dip of interest in the migration. Ranges up to two or three times as long as the depth of borehole 8 may be desirable, or even longer, depending on the application of the present method. However, an overly large aperture can lead to excessive computer time costs, and may also increase the noise level in the migrated image. The considerations required in determining an appropriate migration aperture will be well known to those skilled in the art.

The data gathering geometry for the offset checkshot configuration of FIG. 2 is similar to the geometry used for vertical seismic profile (VSP) data. However, the offset checkshot data are used only to measure direct arrival traveltimes from sources 18 to receivers 20. In contrast, VSP data are generally used to measure both the direct arrival and the reflected arrivals of feature 4 and reflectors 7. In the OCS data, because only direct arrival traveltimes are measured, the signal-to-noise ratio for the offset checkshot data does not have to be as large as is typically required to facilitate processing of VSP and reflected arrivals. This lower signal-to-noise ratio advantage of the offset checkshot survey data offers cost benefits as compared to conventional practice. For example, receivers deployed in production tubing should be able to acquire satisfactory data. This eliminates the cost of removing the tubing, which can be up to $1,000,000 for some boreholes.

In addition, the offset checkshot data can be gathered by hydrophones rather than geophones. Hydrophones typically have lower signal-to-noise ratio reception capabilities than geophones and are therefore often of limited use in VSP data acquisition. However, as noted above, signal-to-noise ratio is not a constraint of the present invention. In addition, it is generally easier to deploy a large number of hydrophones in a borehole, if desired, than it is to deploy a similar number of geophones. Therefore, offset checkshot data could be acquired at numerous depths more easily using hydrophones.

Figure 3:
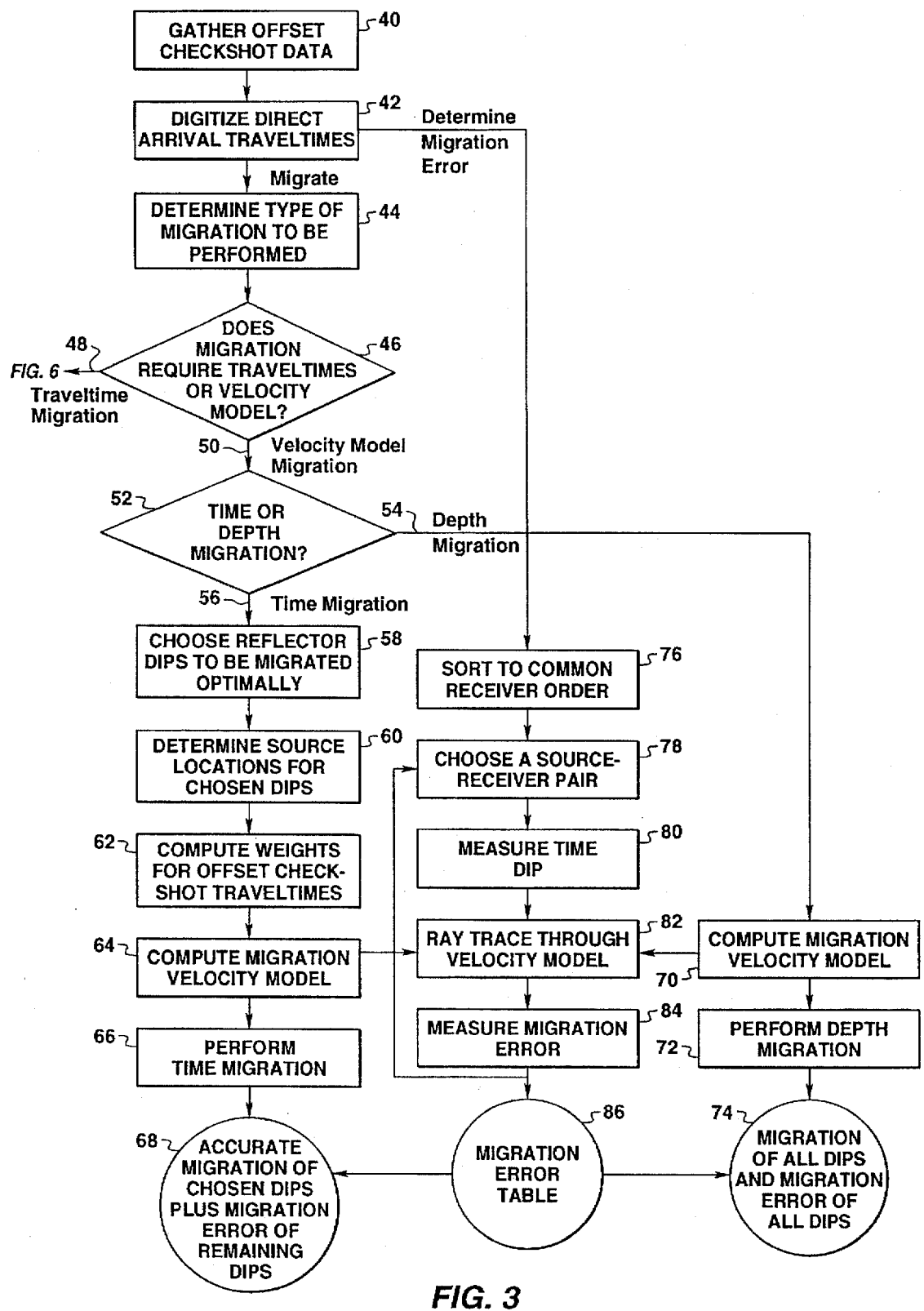
FIG. 3 schematically illustrates the steps required to implement embodiments of the present invention where the chosen migration routine uses a velocity model as an input.

FIG. 3 depicts a flowchart of an embodiment of the present invention. Initially, offset checkshot data 40 are gathered, such as is depicted in FIG. 2. Because these data are only used to determine traveltimes, the spatial aliasing criteria, which as is well known must be met to image reflectors, does not need to be satisfied. This attribute of the present invention allows surface sources 18 and borehole receivers 20 to be relatively sparsely spaced, thus lowering data acquisition cost. For example, a spacing of approximately 150 meters may be sufficient, as compared to conventional borehole spacings of 15 meters. This attribute of the present invention also facilitates acquisition of data over a broad range of distances along surface 2, since lower total costs will be involved in acquiring data over a relatively large range than would be involved in conventional VSP data acquisition.

In step 42 of FIG. 3, the direct arrival traveltimes are selected from the data and are digitized. This step will be well known to those skilled in the art.

Step 44 requires a decision be made on the specific objectives of the migration that is to be performed. This decision is necessary because the embodiment of the present invention which is to be employed may vary as a result of those objectives. Among the considerations involved are the goals of the overall data analysis effort, the expected characteristics of the subsurface region, and the cost and accuracy specifications which the migrated image must meet.

These considerations, which will be well known to those skilled in the art, are most clearly demonstrated by discussing step 44 in conjunction with steps 46 and 52, as follows.

An analyst's decision at step 44 to invoke a relatively low cost migration routine will generally lead to selection of a migration routine using a velocity model at step 46. Examples of such routines include many frequency-wavenumber and finite difference methods for solving the migration wave equation. Another consideration which may lead to velocity model migration is the assumption that the region to be modeled is isotropic.

Figure 6:
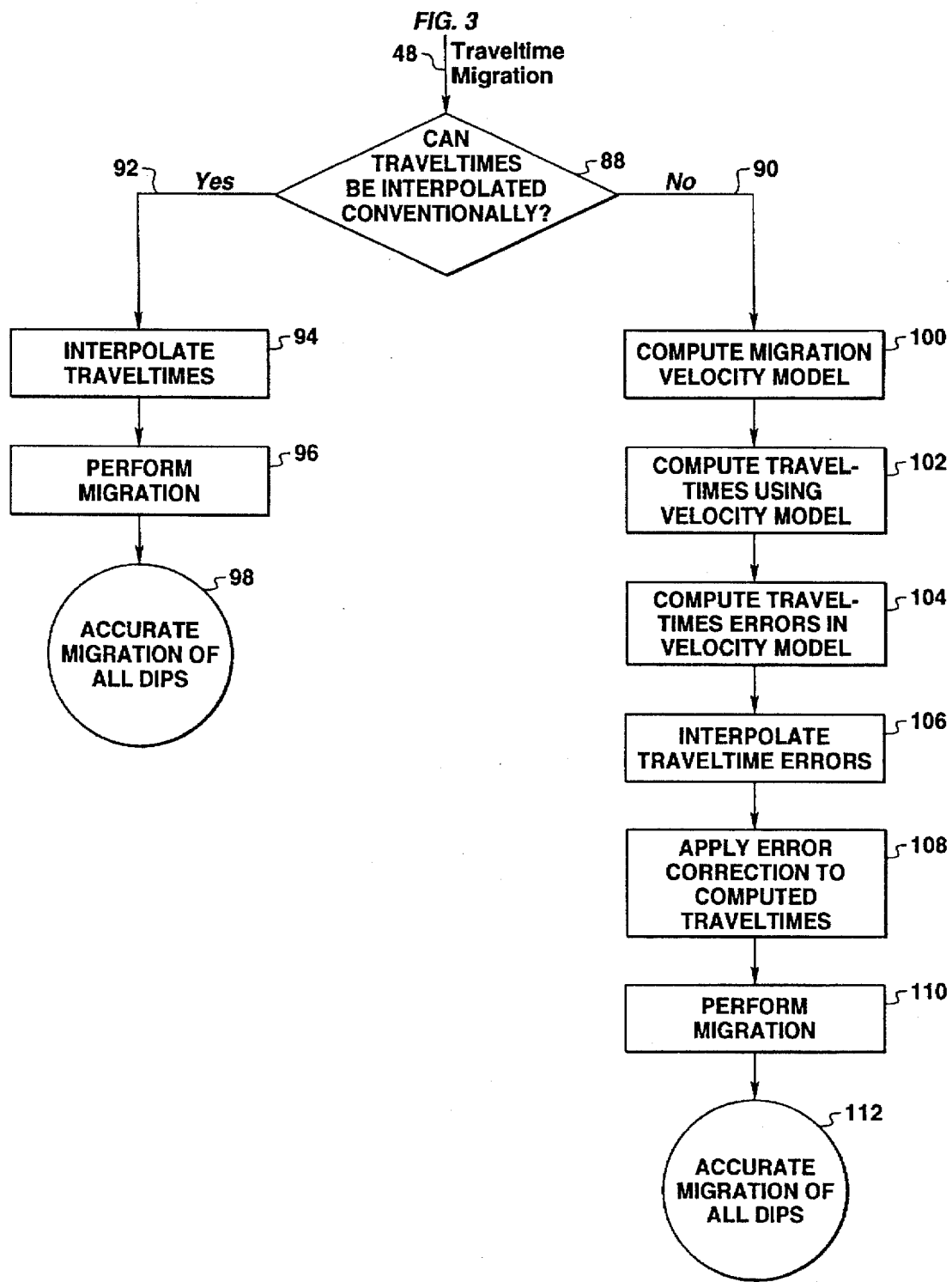
FIG. 6 schematically illustrates the steps required to implement embodiments of the present invention where the chosen migration routine uses traveltimes as an input.

Alternatively, if the analyst opts at step 44 not to explicitly assume an isotropic medium, or requires a more accurate output result which will generally be at higher cost, the migration routine would involve traveltime inputs, and the analyst's decision at step 46 will follow path 48 (continuing on FIG. 6). For example, Kirchhoff migration methods generally accept traveltime inputs directly. The analyses required to determine which migration option is most appropriate or is most desirable under specific circumstances for a given set of seismic data will be well known those skilled in the art. Whether velocity or traveltime inputs are involved, the present invention can be implemented in either a prestack or poststack mode for both two dimensional and three dimensional migration. The present invention provides improved results for each of these migration decisions, as is discussed further below.

If the desired migration routine involves a velocity model analysis, via path 50 on FIG. 3, the analyst must decide at step 52 whether to use time or depth migration.

Time migration (path 56) assumes migration velocities are laterally invariant. As a result, time migration software is less expensive to use than migration programs that attempt to handle lateral velocity variations, such as depth migration. The limitation of that assumption, however, is that a velocity model cannot generally be specified which accurately migrates all dips present in the seismic data. For that reason, time migration may be used, as an example, in the proximity of salt domes where accurate migration of a steeply dipping salt face is more important than is accurate migration of the sediments surrounding the salt. In such applications, the present invention provides a method of finding a velocity model that accurately migrates reflector dips of greatest interest, and in addition provides a measurement of migration error for other dips.

Figure 4:
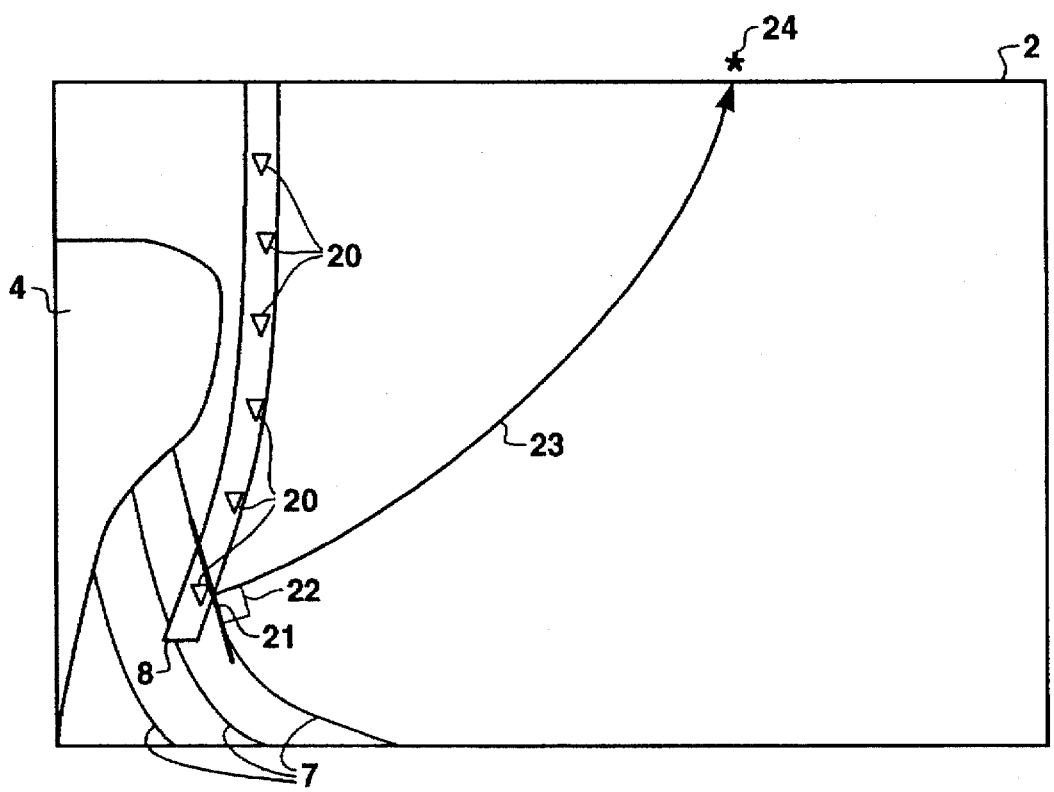
FIG. 4 depicts the raytracing method used to determine the source locations of principal interest in developing a weighted velocity model for a time migration embodiment of the present invention.

If time migration is to be performed, via path 56, the analyst must next select the reflector dips that are of principal interest, step 58. Typically, these would be fairly steep dip reflectors, such as reflectors 7 in FIG. 2, since time migration of flat layers is relatively insensitive to velocity errors. For each receiver in the offset checkshot survey, source locations corresponding to raypaths from the reflector dips of interest are determined, step 60. As depicted in FIG. 4, source locations 24 are determined by selecting a location 21 on each reflector 7 specified in step 58, and by tracing a raypath 23 back to surface 2 using an initial estimate of the migration velocity model (not shown). Location 21 is a tangent to reflector 7 at the position of receiver 20. Raypath 23 departs location 21 at a perpendicular 22 to reflector 7. The desired source location 24 is the point at which raypath 23 intersects surface 2. Techniques for performing ray tracing are well known in the art.

Next, in step 62, weights for the offset checkshot traveltime measurements must be determined. Traveltimes for offset checkshot sources (not shown) near source location 24 in FIG. 4 are given relatively high weights, while those offset checkshot sources at an increasing distance from the source location are less heavily weighted. The purpose of the weights is to ensure that the subsequently derived velocity model produces traveltimes that are most accurate for the dips and raypaths of principal interest, such as reflectors 7 and raypath 23 in FIG. 4, since, as indicated above, determining a velocity model accurate for all possible dips and raypaths is often difficult or impossible. Satisfactory values for the weights are determined by trial and error, based among other factors on the nature of the dips of highest interest, the quality and quantity of the OCS data, and possibly also on the expected nature of the velocity characteristics of the region through which the raypaths pass. The considerations required to determine appropriate weights will be known to those skilled in the art.

A tomographic inversion of the traveltimes is performed in step 64 to derive an updated migration velocity model. The inversion assumes the velocity model is laterally invariant, as is required for time migration, and uses the weighted traveltime measurements from step 62. In addition, other available traveltime data may also be used in the inversion, and may or may not be included in the step 62 weighting procedure, depending on the nature of the other available data and of the dips to be optimally migrated. Parameters may also be included in the inversion to allow determination of a horizontal coordinate stretch factor to compensate for velocity anisotropy. The stretch factor is an artificial scale factor that is applied to the horizontal coordinates of the sources and receivers, and can be used to simulate anisotropic migration with an isotropic migration routine. Use of such a stretch factor will allow a larger range of traveltimes to be accurately predicted, and will increase the migration accuracy for a larger range of dips. If such a stretch factor is employed, it is also applied to the horizontal coordinates of the surface seismic data. Coordinate scale factors are well known in data analysis, and stretch factors have previously been used in industry for analysis of VSP data.

The surface seismic data are time migrated in step 66 using the migration velocity model from step 64. If a horizontal coordinate stretch factor was applied in step 64, the horizontal coordinates of the migrated image are divided by that factor to determine the correctly scaled image.

As will be understood to those skilled in the art, two separate velocity models are often employed during the processing of seismic data. A first velocity model is used to perform the time migration of the seismic data. That migration results in a seismic image with a time-referenced scale. The second model is used to convert the time-reference to depth units. Two velocity models are used in this processing sequence to optimize the processing result. The first model is derived from the surface seismic data which is to be migrated. However, that model will not generally involve a direct reference to absolute depth units. In contrast, the second model is preferably based on data gathered from boreholes, thereby including a depth reference. As is well known in the art, the two models are often quite different, for example due to anisotropy.

An advantage of the OCS data is that both an optimal migration velocity model and an optimal depth conversion velocity model can be obtained simultaneously. As described above, a tomographic inversion of the traveltimes is performed to obtain a migration velocity model. As part of that inversion, an inversion for the depths of the OCS receivers is also performed. This receiver depth inversion results in a velocity model with a closer fit to the measured traveltimes than is generally possible if measured receiver depths are used. As part of the receiver depth inversion, vertical stretch parameters may be used to improve the inversion fit to the measured data. These parameters increase the likelihood that the model will accurately characterize the OCS data, and therefore increase the accuracy of the migrated image. As above, the velocity model which results is used to time migrate the seismic data. The depth conversion is performed using the velocity/depth relationship which also results from the inversion. This two-part inversion ensures an optimal depth image, because the migration is performed with a velocity which reproduces the measured traveltimes as closely as possible, and because that velocity also contains as accurate a depth reference as possible. An advantage of the present method is that the optimal depth image is obtained without the prior art's common requirement of employing two separate velocity models.

The result at step 68 is an image which is accurate at the borehole for the dips of principal interest which were selected in step 58. Dips adjacent to the dips of principal interest will also be accurately migrated, with the range of accuracy corresponding to the range around the borehole in which the assumption of lateral invariance is valid. At other dips, however, the image may be incorrectly located. Steps 76 through 86 provide an embodiment of the invention which allows that error to be quantified, however, as follows.

Figure 5A:
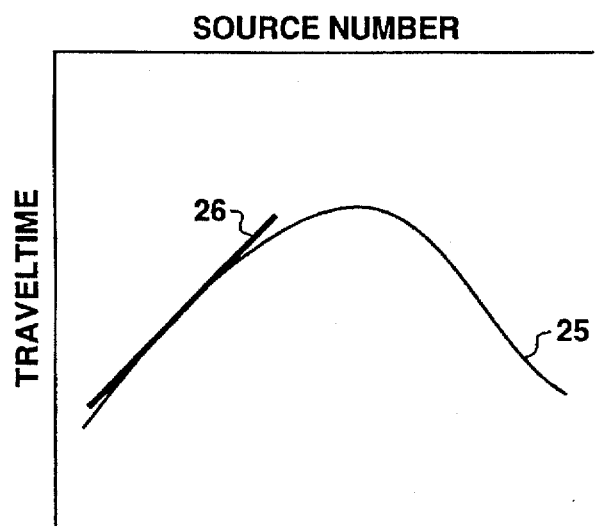
FIG. 5A depicts a traveltime curve derived from common receiver-sorted traveltime data.
Figure 5B:
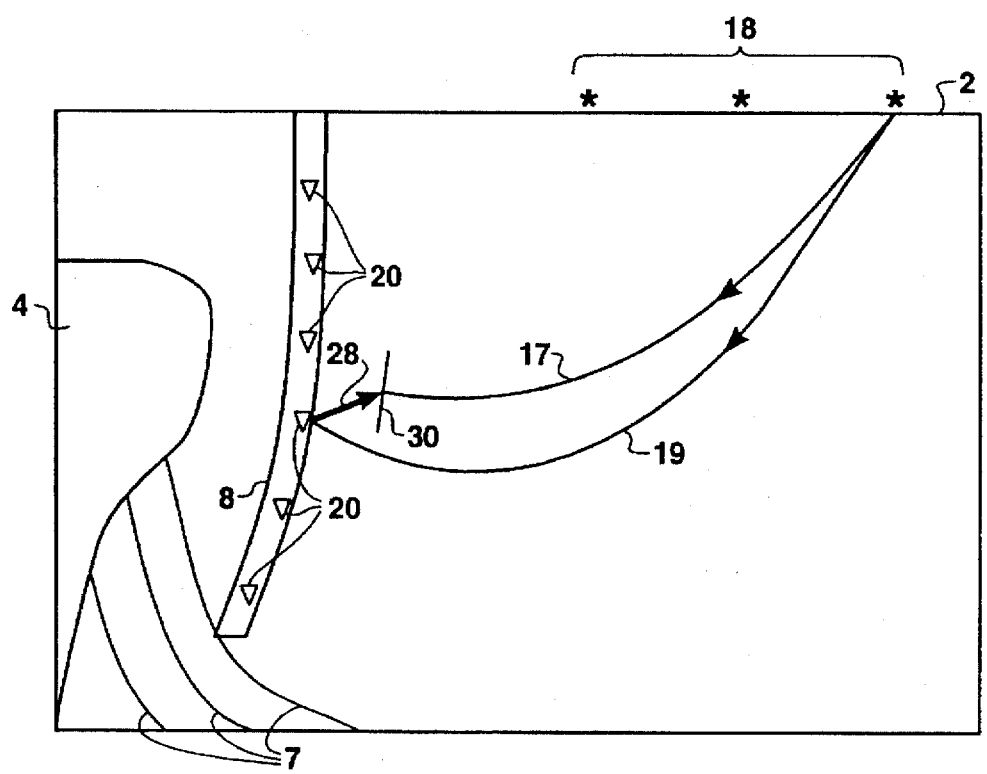
FIG. 5B depicts a method of determining migration error using offset checkshot data.

FIGS. 3, 5A and 5B demonstrate the use of an embodiment of the present invention to calculate migration error when a velocity model is used in the migration. After the offset checkshot data are gathered, step 40, and the traveltimes are digitized, step 42, the checkshot data are sorted into common receiver order, step 76. The sorted data allow generation of traveltime curves such as are depicted in FIG. 5A. In that figure the traveltimes corresponding to one receiver are plotted as a function of all checkshot sources, thus leading to the title common receiver-sorted traveltime curve. For each source-receiver pair, step 78 in FIG. 3, the time dip on the traveltime curve is measured, step 80. As shown in FIG. 5A, time dip 26 is merely the slope of a tangent to curve 25 for the selected source.

Using the migration velocity model from step 64, step 82 involves tracing a raypath from the surface using the time dip from step 80. As shown in FIG. 5B, migration raypath 17 is traced through the velocity model from the surface location of each offset checkshot source using the corresponding time dip 26 until the raypath's traveltime is equal to the measured offset checkshot traveltime for the chosen source-receiver pair. The raypath is called the migration raypath because it defines the location and dip to which the measured time dip will move after migration.

The reflector location and dip corresponding to migration raypath 17 is a plane 30 that is perpendicular to the endpoint of raypath 17. If the migration velocity model is accurate, the location of plane 30 will coincide with the position of the borehole receiver 20 which was paired with the source in step 78 of FIG. 3. In that situation migration raypath 17 and checkshot raypath 19 will coincide. If the model is inaccurate, the migration error for the reflector location and dip can be determined from vector 28, which is drawn from receiver 20 to the endpoint of migration raypath 17. Vector 28 determines the reflector location error resulting from the inaccuracy in the velocity model. The spatial orientation of plane 30 determines the dip error resulting from the inaccuracy in the velocity model.

This procedure is repeated in step 78 for all source-receiver pairs, resulting at step 86 in generation of an output table of migration error as a function of migrated location and dip. Combined with the results of the time migration application of this embodiment of the present invention, step 68 in FIG. 3, this migration error table provides both an accurate time migration of the reflector dips chosen in step 58 and a quantification of the migration error for all other reflector dips. The geologic interpreter can use the error table to determine the correct location and dip of a reflection from an inaccurately migrated image.

FIG. 3 also indicates that the present invention can be implemented in embodiments involving depth migration. Depth migration is frequently used to migrate seismic data in areas having a laterally varying migration velocity. In such areas, migration velocities are required that accurately reproduce traveltimes for all raypaths to all dips, rather than for a subset of traveltimes corresponding to some chosen dips. In depth migration applications, the present invention provides a method of finding more accurate velocity models than have previously been possible, and simultaneously allows for the measurement of migration error for all dips.

In depth migration applications, conventional velocity analysis methods are used to produce a velocity model, step 70 in FIG. 3. These methods generally involve using the surface seismic data in an optimization routine to develop a velocity model for the entire subsurface domain of interest. The optimization objective is to accurately reproduce traveltimes for all raypaths, rather than a subset of raypaths as is of principal interest in time migration. These and other suitable velocity model generation methods will be well known to those skilled in the art.

As discussed above in conjunction with FIG. 1, the limitation of the velocity models which result from these methods is that raypaths 11, 15a and 15b do not accurately characterize the raypaths used in migration. However, the offset checkshot survey raypaths, 19 in FIG. 2, overcome that limitation. As a result, by using the offset checkshot survey data, the present invention allows more accurate velocity models to be determined from conventional velocity model generation methods. Once that model has been determined, step 70 in FIG. 3, the depth migration proceeds, step 72. Because the model is more accurate, all dips in the migration domain are more accurately migrated than has previously been possible.

To the extent that the velocity model nevertheless produces traveltimes that are inconsistent with the measured traveltimes, some dips will be mispositioned. The same error quantification procedure discussed above in conjunction with time migration, steps 76 through 86, can be employed in conjunction with the depth migration to determine the amount of migration error at borehole 8. As in time migration, the computed errors can be used to obtain a geologic interpretation that will be more robust than that obtained from a conventional depth migration.

The migration velocity model building process discussed above in conjunction with time migration could also be used to build the velocity model for a depth migration application of the present invention (not shown in FIG. 3). In such a case, path 54 would lead directly to steps identical to steps 58–64, which would replace step 70. An example of an application of this embodiment of the present invention would be where specific reflector dips are present which the analyst desires to optimally migrate, but where the time migration assumption of laterally invariant velocities is not applicable.

If the analyst's decision at step 46 of FIG. 3 is to employ a migration method involving traveltimes rather than velocity inputs, via path 48, the flowchart of FIG. 6 depicts the steps that would be followed in two additional embodiments of the present invention. Such a decision might be involved if the analyst requires a more accurate migration result, and is prepared to accept the typically higher cost that is generally involved. Traveltime migrations generally assume an isotropic medium, although that is not a requirement of the steps depicted in FIG. 6.

Typically, traveltimes are determined from raytracing through a velocity model. However, that approach has several limitations, including that velocity models are often inaccurate, raytracing programs do not always account for all physical effects, such as anisotropy, and raytracing programs usually calculate only the first arrival times, whereas later arrivals may be more important. Because the offset checkshot data of the present invention are a direct measurement of traveltimes required for accurate migration, the invention provides a method for avoiding these limitations. In addition, avoiding the derivation of a migration velocity model is beneficial in that the derivation can be a computationally costly and labor intensive part of migrating seismic data.

Because offset checkshot traveltimes cannot generally be measured for every point in the region to be migrated, traveltime interpolation must be employed before the migration can proceed. If the offset checkshot traveltimes have been gathered at a sufficient number of locations within the imaging region, conventional interpolation methods can be employed, step 92 in FIG. 6. As will be understood to those skilled in the art, a sufficient number of locations will have been involved when interpolating a subset of the checkshot data reproduces measurement locations not included in the subset used in the interpolation within a reasonable, prespecified degree of accuracy. Such conventional methods as linear interpolation and cubic spline techniques will be appropriate for this interpolation step.

Figure 7:
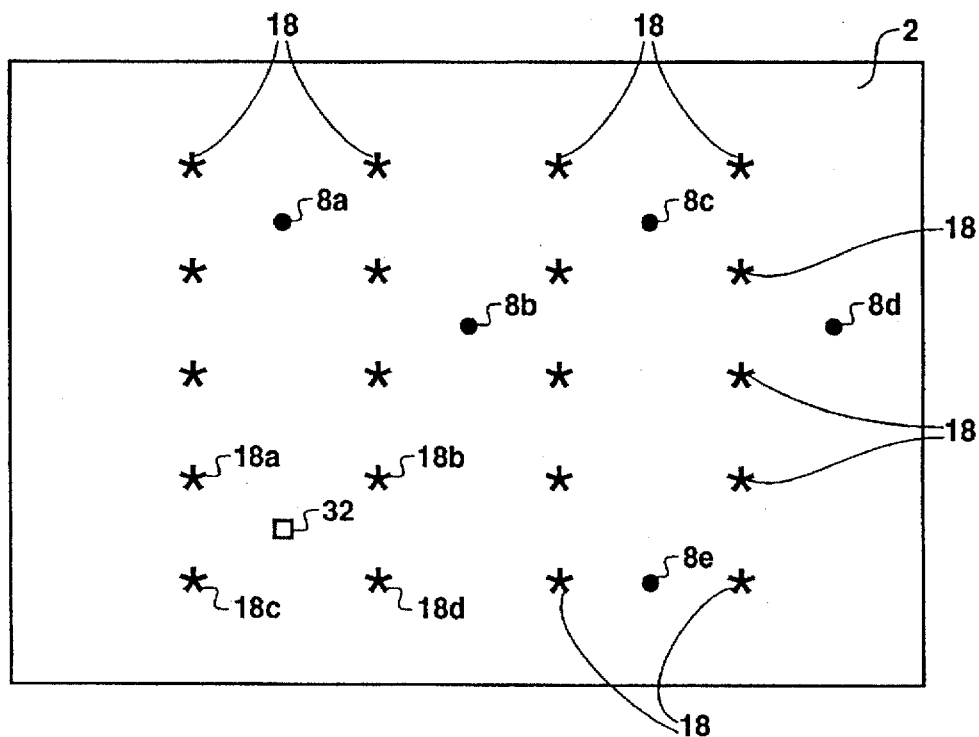
FIG. 7 depicts a plan view of a checkshot source grid for use in a multi-borehole traveltime migration embodiment of the present invention.

One application of this embodiment of the present method is depicted in FIG. 7. In this plan view of surface 2, a plurality of boreholes 8a–e have been previously drilled in the region of a feature to be imaged (not shown). OCS data for receivers (not shown) in each borehole 8a–e were obtained from a grid of OCS sources 18. The grid of sources 18 does not need to be identically located along surface 2 for the OCS data corresponding to each borehole 8a–e, and due to field measurement constraints, such as equipment cost and availability, will often not be identical. The benefit of the OCS data in this example, as discussed above, is that the OCS grid can be relatively sparsely spaced, both as to source spacing and as to receiver spacing. This results from the OCS data's use for traveltimes, and not for imaging.

The OCS data in this example are used to interpolate measured traveltimes to the locations at which imaging is to occur. This will generally involve at least two interpolations. The first interpolation will be along surface 2. For example, location 32 in FIG. 7 is the location of an imaging source for the data from which the migration image will be derived. However, location 32 is not the location of an OCS source. Therefore, to obtain traveltimes from location 32 to the OCS receivers in each well 8a–e, an interpolation of measured traveltimes from the nearest OCS sources must be performed. In FIG. 7, OCS sources 18a, 18b, 18c, and 18d are used to determine the traveltimes from location 32 to the locations of the OCS receivers in each borehole 8a–e.

The second interpolation is between OCS receivers in each well. As discussed above, the OCS receivers in boreholes 8a–e will be relatively sparsely spaced, and will generally not be coincident with all locations where a migrated image is desired to image all subsurface regions of interest. Therefore, an interpolation will be required between traveltimes measured in boreholes 8a–e to the locations at which migration images are to be calculated. Procedures to perform this interpolation will be known to those skilled in the art.

This embodiment of the present method may also be usefully applied to single well OCS data, for example when an assumption of traveltime lateral invariance is appropriate. Other applications will be apparent to those skilled in the art.

When the conventional interpolations, step 94, have been completed, the migration proceeds, step 96. The image formed in step 98 will accurately position reflector dips at the offset checkshot receiver locations. Because no velocity model has been employed, the present invention offers that accurate result without requiring an error quantification analysis. The accuracy of other parts of the image, e.g. reflector dips at other than the offset checkshot receiver locations, hinges only on the accuracy of the interpolation method.

This conventional interpolation-based migration method will be most useful for accurate imaging of limited subsurface regions since acquiring sufficient offset checkshot survey data over large regions will generally be too costly. One possible application would be to accurately image a small region near a known reservoir. Other possible applications will be known to those skilled in the art.

Offset checkshot traveltimes can be used to migrate over larger subsurface regions using more sophisticated interpolation procedures, as outlined in the embodiment following path 90 in FIG. 6. This embodiment involves use of a migration velocity model to guide the interpolation of the offset checkshot traveltimes, and is directed at applications in which conventional interpolation cannot be employed. The velocity model guides the interpolation, but is not otherwise a direct part of the migration.

A migration velocity model is computed using conventional methods, step 100. Such methods, as discussed above, will be well known to those skilled in the art. However, as discussed above in conjunction with step 70, it will generally be desirable to incorporate the offset checkshot survey data into the velocity model computation.

Next, step 102, traveltimes are computed by raytracing through this velocity model. Computed traveltimes which correspond to the sources and receivers in the offset checkshot survey are compared to the measured offset checkshot traveltimes, and traveltime errors are calculated, step 104. These errors are the measured traveltimes minus the calculated traveltimes. Note that this step differs from step 84 above in that only a traveltime error is calculated, not an actual migration error vector as was calculated in that step.

Figure 8:
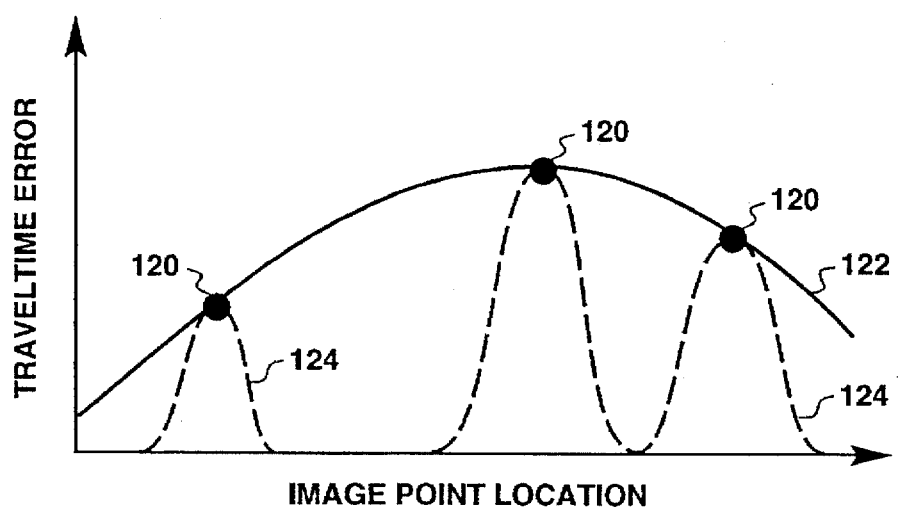
FIG. 8 depicts two methods of interpolating traveltime error for use in correcting the image location of a traveltime migration embodiment of the present invention.

The traveltime errors are next interpolated to migration raypaths not included in the offset checkshot survey data, step 106. As demonstrated in FIG. 8, the interpolation procedure to be used depends upon the type of error expected. For image point locations corresponding to the source and receiver raypaths in the offset checkshot survey data, a traveltime error estimate, 120 in FIG. 8, results from step 104. If the errors are believed to be caused by large scale phenomena, such as anisotropy, and the phenomena are not expected to vary rapidly, conventional interpolation methods such as described above may be satisfactorily applied to the errors. Such a smoothly varying error function is depicted as curve 122 in FIG. 8.

If, on the other hand, the errors are expected to be due to small scale effects which may exhibit rapid spatial variation, the analyst may opt to set the error to zero except in the immediate neighborhood of the image point location. This type of error function is depicted as curve 124 in FIG. 8. An example of a situation in which the error is locally variable may be in the proximity of salt domes where the measured traveltimes may be greatly influenced by the local, out-of-plane geometry of the salt.

Once an appropriate error function has been determined, the migration traveltimes computed in step 102 of FIG. 6 are corrected by adding the interpolated error, step 108. The migration is performed using the corrected traveltimes, step 110. The corrected traveltimes guarantee accurate migration at the borehole of all reflector dips, step 112, and for that reason no migration error computation is required.

It will be understood by those skilled in the art that the present invention is applicable to both on land and offshore operations. Any type of on land or marine seismic source may be used to generate the seismic signals. It will be further understood that for on land operations the seismic source is often buried a distance up to 100 feet or more below the actual surface of the earth so that the seismic signal is generated below the weathered surface layers of earth which can greatly attenuate seismic signals. All such seismic sources are within the scope of the present invention. Furthermore, an inverse offset checkshot configuration is also within the scope of the invention. In that configuration the receivers would be placed on or below the earth's surface, or in an overlying body of water, and the sources would be placed in a borehole. Therefore, it should be understood that the invention is not to be unduly limited to the foregoing which has been set forth for illustrative purposes. Various modifications and alternatives will be apparent to those skilled in the art without departing from the true scope of the invention, as defined in the following claims.

What is claimed is:

1. A method for migrating seismic data acquired from dipping reflectors, said method comprising the steps of:
   (a) acquiring offset checkshot data from an offset checkshot survey of a subsurface region adjacent to said dipping reflectors, said offset checkshot survey having at least one checkshot source and at least one checkshot receiver positioned such that the raypaths of said offset checkshot data are geometrically similar to the migration raypaths to be used in migrating said seismic data;
   (b) determining direct arrival traveltimes from said offset checkshot data;
   (c) interpolating said direct arrival traveltimes to determine migration traveltimes; and
   (d) using said migration traveltimes to migrate said seismic data.

2. The method of claim 1, wherein said subsurface region has a borehole therein adjacent to said dipping reflectors, and wherein said checkshot sources are located at or near the surface of the earth and said checkshot receivers are located in said borehole.

3. The method of claim 2, wherein said seismic data was acquired with at least one imaging source and at least one imaging receiver, and wherein said offset checkshot data involves at least one grid of checkshot sources, and further involves at least two boreholes, each of said boreholes having at least one checkshot receiver located therein, said interpolation comprising the steps of:
   (a) interpolating from said grid of checkshot sources to the location of at least one imaging source; and
   (b) interpolating from said checkshot receivers to the location of at least one imaging receiver.

4. The method of claim 1, wherein said subsurface region has a borehole therein adjacent to said dipping reflectors, and wherein said checkshot receivers are located at or near the surface of the earth and said checkshot sources are located in said borehole.

5. A method for migrating seismic data acquired from dipping reflectors, said method comprising the steps of:

(a) acquiring offset checkshot data from an offset checkshot survey of a subsurface region adjacent to said dipping reflectors, said offset checkshot survey having at least one checkshot source and at least one checkshot receiver positioned such that the raypaths of said offset checkshot data are geometrically similar to the migration raypaths to be used in migrating said seismic data;

(b) determining direct arrival traveltimes from said offset checkshot data;

(c) using said direct arrival traveltimes to correct errors in migration traveltimes, wherein said migration traveltimes are derived from a migration velocity model; and (d) using said corrected migration traveltimes to migrate said seismic data.

6. The method of claim 5, wherein said migration traveltimes are obtained from raytracing through said migration velocity model, and wherein said errors are the differences between said raytraced traveltimes and said direct arrival traveltimes.

7. The method of claim 5, further comprising the step of interpolating said errors to migration raypaths not included in said offset checkshot data.

8. The method of claim 7, wherein said interpolation involves determination of an error function.

9. A method for migrating seismic data acquired from dipping reflectors, said method comprising the steps of:

(a) acquiring offset checkshot data from an offset checkshot survey of a subsurface region adjacent to said dipping reflectors, said offset checkshot survey having at least one checkshot source and at least one checkshot receiver positioned such that the raypaths of said offset checkshot data are geometrically similar to the migration raypaths to be used in migrating said seismic data;

(b) determining direct arrival traveltimes from said offset checkshot data;

(c) using said direct arrival traveltimes to determine a migration velocity model;

(d) migrating said seismic data using said migration velocity model; and (e) using said-offset checkshot survey data and said migration velocity model to determine a migration error table for said migrated seismic data.

10. The method of claim 9, wherein said determination of said migration error table comprises the steps of:

(a) sorting said offset checkshot data into common receiver order and generating a traveltime curve for each checkshot receiver as a function of checkshot source location; and (b) for each source-receiver pair in said offset checkshot data, (i) measuring a time dip for said checkshot source on said traveltime curve for said checkshot receiver, (ii) using said time dip, tracing a raypath from said checkshot source through said migration velocity model until the traveltime for said raypath is equal to said direct arrival traveltime for said source-receiver pair, and (iii) determining a migration error vector between said checkshot receiver location and the endpoint of said raypath.

11. The method of claim 10, wherein said migration error table contains reflector location error and reflector dip error.

12. The method of claim 9, said method further comprising the steps of:

(a) preselecting at least one of said dipping reflectors;

(b) determining a checkshot source location for each said preselected dipping reflector; and (c) for each said checkshot source location, determining direct arrival traveltime weighting factors, wherein said determination of said migration velocity model uses said weighting factors and said direct arrival traveltimes.

13. The method of claim 12, wherein said determination of said migration error table comprises the steps of:

(a) sorting said offset checkshot data into common receiver order and generating a traveltime curve for each checkshot receiver as a function of checkshot source location; and (b) for each source-receiver pair in said offset checkshot data, traveltime for said raypath is equal to said direct arrival traveltime for said source-receiver pair, and (iii) determining a migration error vector between said checkshot receiver location and the endpoint of said raypath.

14. The method of claim 13, wherein said migration error table contains reflector location error and reflector dip error.

* * * * *